Patented Nov. 18, 1952

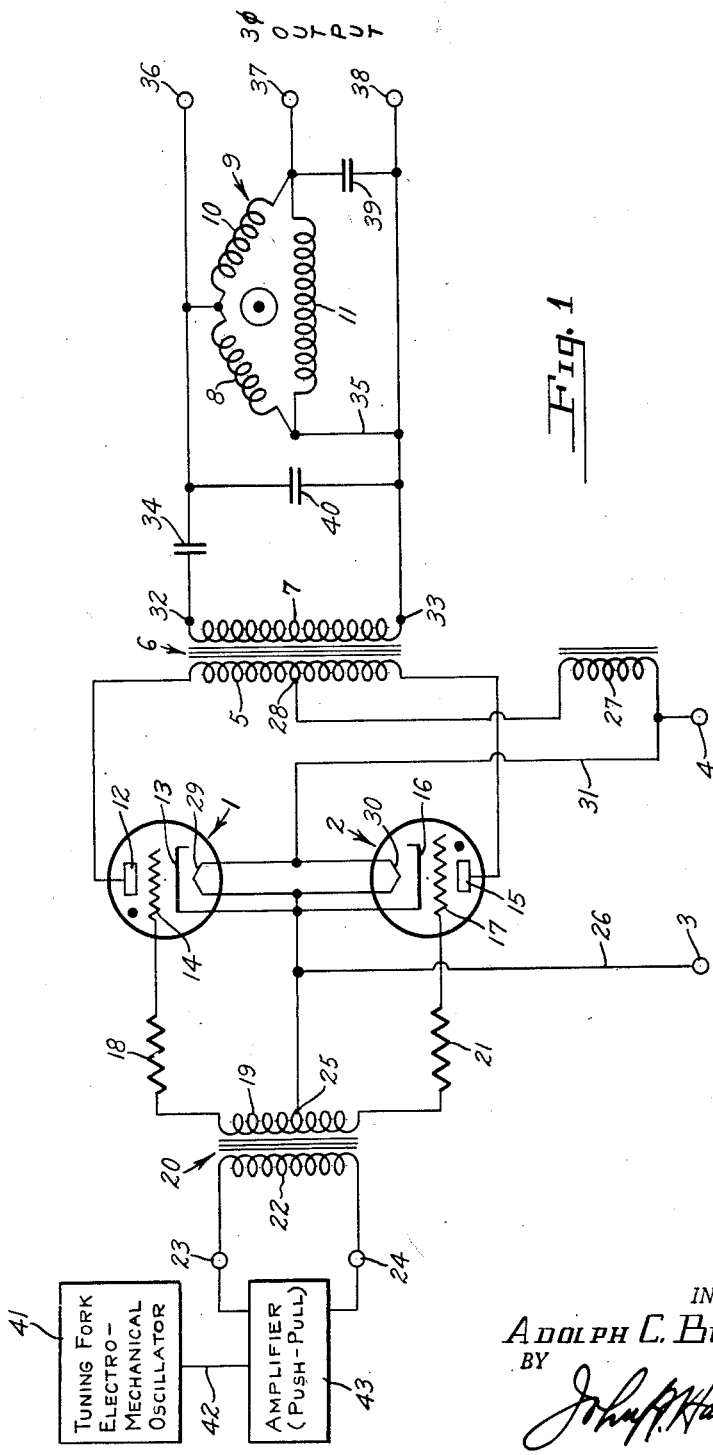

2,618,772

UNITED STATES PATENT OFFICE 2,618,772

THREE-PHASE CONSTANT FREQUENCY ELECTRONIC POWER SUPPLY

Adolph C. Bunblasky, New Canaan, Conn., assignor to Sorensen & Company, Inc., Stamford, Conn., a corporation of Connecticut Application January 19, 1949, Serial No. 71,665

5 Claims. (Cl. 321—5)

1

The present invention relates to power supplies and more particularly to a power supply which is adapted to provide a polyphase, as a three phase, alternating current supply from a direct current source.

Many electrical devices require a three phase power supply and yet such a supply is not always available. In many instances such as, for example, in an airplane where space and weight are important considerations, it is not always possible or feasible to generate a three phase alternating current supply in the conventional manner. Quite often, however, a direct current supply is available and a three phase alternating supply is desired. There is, therefore, a particular need for a relatively simple, compact and yet highly accurate device which can convert a direct current source into a three phase alternating current supply.

An object of the present invention is to provide a power supply which will transform a direct current source into a three phase alternating current supply.

It is another object of the present invention to provide a power supply which is adapted to convert a direct current into three phase alternating current where the frequency of the alternating current is accurately controlled within predetermined limits.

A further object of the present invention is to provide a power supply adapted to convert a direct current into a three phase alternating current where the frequency of the alternating current is precisely controlled by a tuning fork.

Still another object of the present invention is to provide a simple yet highly accurate and reliable circuit which will accomplish the above objects by first electronically transforming the direct current supply to a single phase alternating current and thence converting the single phase current to three phase current by electromechanical means.

Other objects and advantages of the invention will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention and the scope of the appended claims.

In the drawing:

The figure is a schematic circuit diagram of one embodiment of the present invention.

2

Referring now to the drawing, the circuit shown comprises essentially an inverter including a pair of gas filled thyratron tubes 1 and 2 and their associated components, presently to be described, which converts a direct current supply appearing across terminals 3 and 4 into a single phase alternating current. The output of the inverter is developed across primary winding 5 of transformer 6, a corresponding voltage being developed across secondary 7 of said transformer. The output of secondary winding 7 is then applied to a phase winding 8 of a three phase synchronous motor 9. Phase winding 10 and phase winding 11 comprise the other two windings of three phase motor 9.

Gas filled thyratron 1, having an anode 12, a cathode 13 and a grid 14, forms one element of the inverter. Similarly, gas filled thyratron 2 has an anode 15, a cathode 16 and a grid 17 and forms another element of the inverter. Grid 14 of thyratron 1 is connected through a grid circuit resistance 18, the secondary winding 19 of a grid transformer 20 and a grid resistance 21 to the grid 17 of thyratron 2. Primary winding 22 of grid transformer 20 is connected by input terminals 23 and 24 to a suitable source of alternating current. The purpose of grid transformer 20 is to apply a highly stable-frequency control voltage to grids 14 and 17 of the thyratrons 1 and 2, respectively.

The source of alternating current supplied to input terminals 23 and 24 of grid transformer 20 may be from any suitable source such as a highly stable oscillator or it may be derived from a highly stable electro-mechanical generator. In the present embodiment, it is preferable to introduce the exciting voltage from an external source such as electro-mechanical oscillator 41 and amplifier 43. In the embodiment shown, oscillator 41 is essentially a vacuum tube oscillator whose frequency is precisely controlled by the frequency of a resonating tuning fork. As oscillators controlled in this manner are well known in the art, a complete schematic circuit diagram of this component of the invention has not been shown. The output of oscillator 41 is applied through connection 42 to a push pull amplifier 43. The output from push pull amplifier 43 is thence applied to input terminals 23 and 24 of grid transformer 20. It will be evident to one skilled in the art, however, that the inverter including the thyratrons 1 and 2 may be self excited. As will be seen presently, the frequency of this input voltage controls the frequency of the output.

The center tap 25 of secondary winding 19 is directly connected to the cathode 13 of thyratron 1 and cathode 16 of thyratron 2. Cathode 13, cathode 16 and center tap 25 are thence connected by means of connection 26 to direct current input terminal 3. Thus, it is evident that center tap 25, cathode 13 and cathode 16 are maintained at the same potential. Direct current input terminal 3 is negative with respect to direct current input terminal 4. Anode 12 of thyratron 1 and anode 15 of thyratron 2 are connected together through primary winding 5 of the transformer 6. A positive potential is applied to anode 12 and anode 15 by a connection from the positive input terminal 4 through load inductance 27 to the center tap 28 of the primary winding 5.

In the present embodiment, it will be observed that the entire voltage at direct current input terminals 3 and 4 is impressed across filaments 29 and 30 of thyratrons 1 and 2, respectively, by means of connections 26 and 31. This is permissible in the present embodiment as it is assumed that the direct current input voltage at terminals 3 and 4 is relatively low. Should a higher direct current supply voltage be used, it is evident that other means of heating the filaments could be used.

As the thyratrons under the control of the grid voltage will alternately be conducting and non-conducting the voltage developed across the transformer 6 will be alternating in character. This single phase alternating current output developed across primary 5 of transformer 6 also appears across terminals 32 and 33 of the secondary winding 7. A commutating condenser 34 is provided, one of its sides being connected to terminal 32 while its other side is connected through phase winding 8 of the three phase synchronous motor 9 thence through a connection 35 to terminal 33 of secondary winding 7.

Thus, the single phase voltage appearing across commutating condenser 34 is applied to one phase winding 8 of the polyphase winding of synchronous motor 9 and thus polyphase voltages are developed across output terminals 36, 37 and 38. Condenser 39 is connected across terminals 37 and 38 as an aid in the operation of the synchronous motor. A three phase synchronous motor when operated from a single phase supply develops three phase voltages across the polyphase windings and is known in the electrical art as a phase converter. An induction motor can be similarly used to convert single phase power to three phase power. Such a phase converter is not limited to converting single phase to three phase, for example, if the single phase voltage is applied to one phase of a two phase motor a quadrature voltage exists across the terminals of the other phase.

A condenser 40 is connected across phase winding 8 of three phase synchronous motor 9 where it acts as a low impedance path for higher harmonics contained in the waveform appearing across condenser 34 and thus acts to improve the waveform of the single phase voltage applied to phase winding 8.

Commutating condenser 34 may be connected directly between anode 12 of thyratron 1 and anode 15 of thyratron 2 but in the present invention, improved operation of the inverter is obtained by connecting it as shown in the drawing and as described above. In operation, the exciting or frequency control voltage as it may be called is applied to input terminals 23 and 24 of grid transformer 20, the purpose of this voltage is to excite the grids of the thyratrons and to control the firing thereof and to thereby control the frequency of the alternating current output. As the purpose of this voltage is to excite the grids and to provide a synchronizing or frequency control voltage, it is apparent that a very small amount of power is required for this input energy.

As the control voltage is alternating in character the polarity of the voltage developed between center tap 25 of secondary winding 19 and grid 14 will be opposite to that developed between center tap 25 and grid 17. Thus, when grid 14 is positive, grid 17 is negative, and vice versa, and each tube conducts during one half of the cycle of grid excitation voltage. Inasmuch as once a thyratron is fired by the grid, the grid then loses control and means must be provided for extinguishing one thyratron while the other conducts. This is accomplished by means of commutating condenser 34 which charges when thyratron 1 conducts causing terminal 32 to be negative and terminal 33 positive. When thyratron 2 conducts, the charge on condenser 34 is in effect connected between anode 12 and cathode 13 thereby making anode 12 negative with respect to cathode 11.

Thus thyratron 1 is extinguished and grid 14 can regain control. This charging and discharging of commutating condenser 34 takes place at a frequency equal to that of the frequency of the exciting voltage applied to grids 14 and 17. Load inductance 27, connected between positive direct current input terminal 4 and center tap 28, acts in conjunction with commutating condenser 34, and condenser 40 to provide a substantially semisoidal waveform across phase winding 8.

While there has been here described one embodiment of the present invention, it will be apparent to one skilled in the art that various changes and modifications may be made therein without departing from the spirit of the invention. For example, it is evident that the frequency of the three phase output across terminals 36, 37 and 38 may be readily varied by varying the frequency of the exciting voltage applied to the input terminals 23 and 24.

Having thus set forth the nature of my invention, what I claim is:

1. A power pack adapted to convert direct current power into three phase alternating current power, said power pack including a relatively high power direct current input, an inverter, said inverter including gas filled discharge tubes each having an anode, a cathode and a grid, a common anode circuit for said gas discharge tubes including a transformer therein having a primary circuit and a secondary circuit, means for applying said relatively high power direct current to each of said anodes, a commutating condenser for said gas discharge tubes, said commutating condenser being serially in the secondary circuit of said transformer, the voltage across said secondary being a relatively high power single phase alternating current voltage, relatively low power single phase alternating current means for synchronizing the firing of said gas discharge tube means to predetermine the frequency of said relatively high power single phase alternating current voltage, a converter comprising an alternating current motor having three phase windings, means for applying said relatively-high power single phase alternating current voltage across at least one winding of said three phase windings, and terminal means connected to each winding of said three phase windings whereby relatively high power three phase alternating current voltages are developed across said terminal means.

2. A power supply adapted to convert direct current power into three phase alternating current power, said power supply including a direct current input circuit having a positive terminal and a negative terminal, at least two gas filled discharge tubes each having at least a cathode, an anode and a grid, a grid transformer having a primary winding and a secondary winding, said secondary winding being connected between each of said grids, a center tap terminal associated with said secondary winding, a connection between said center tap and each of said cathodes, means for applying an alternating current voltage to said primary winding, an output transformer having a primary winding and a secondary winding, said primary winding being connected between said anodes, a center tap terminal associated with said primary winding, an inductance having one terminal thereof connected to said last mentioned center tap terminal, the other terminal of said inductance being connected to the positive terminal of said direct current input circuit, a connection between the first mentioned center tap terminal and the negative terminal of said direct current input circuit, a first condenser one side thereof being connected to one terminal of the secondary of said output transformer, a commutating condenser serially connected between said first condenser and the other terminal of the secondary of said output transformer, an alternating current motor having three phase windings, means for applying the voltage across said first condenser to at least one winding of said three phase windings, and terminal means connected to each winding of said three phase windings whereby three phase alternating current voltages are developed across said terminal means.

3. A simple compact power pack comprising a single phase inverter means, means to supply a low power single phase alternating current, means for supplying relatively high direct current power to said inverter means, means to impress said low power single phase alternating current on said single phase inverter whereby a relatively high power single phase alternating current output having a frequency equal to the frequency of said low power single phase current is obtained from said inverter, an output transformer having a primary winding and a secondary winding, said primary winding forming an output circuit for said single phase inverter, means for improving the waveform of the output from said inverter comprising a capacitance connected to one terminal of the secondary of said output transformer, a commutating capacitor for said inverter serially connected between said first capacitor and the other terminal of said output transformer, a self-starting converter adapted to convert single phase alternating current to three phase alternating current, said self-starting converter comprising a motor having three phase windings, one of said windings being connected across said commutating capacitor, a capacitance connected across another of said three phase windings whereby said phase converter is self-starting, and terminal means connected to said three phase windings whereby three phase voltages are developed across said terminal means.

4. A simple compact accurate power pack comprising a direct current input of relatively high power, at least two gas filled discharge tubes each having at least a cathode, an anode and a grid, transformer means connected between said grids, means to supply a relatively low power single phase alternating current to said transformer means, means for applying said direct current input to the anodes of said gas discharge tubes, an output transformer having a primary winding and a secondary winding, said primary winding being connected between the anodes of said gas filled discharge tubes whereby a relatively high power single phase alternating current having a frequency equal to that of said relatively low power single phase current is developed across said output transformer, means for improving the waveform of said output comprising a capacitor connected to one terminal of the secondary of said output transformer, a commutating capacitor for said gas filled discharge tubes serially connected between said first capacitor and the other terminal of said output transformer, a self-starting converter adapted to convert single phase alternating current, said self-starting converter comprising a motor having three phase windings, one of said windings being connected across said commutating capacitor, a capacitance connected across another of said three phase windings whereby said phase converter is self-starting, and terminal means connected to said three phase windings whereby three phase voltages are developed across said terminal means.

5. A simple compact accurate power pack comprising a highly stable oscillator adapted to generate a relatively low power single phase alternating current, a single phase inverter, means for supplying a relatively high direct current power to said inverter, means to impress said low power single phase alternating current on said single phase inverter whereby a relatively high power single phase alternating current output having a frequency equal to the frequency of said low power single phase current is obtained from said inverter, a self-starting converter adapted to convert single phase alternating current to three phase alternating current, said self-starting converter comprising a synchronous motor having three phase windings, means for applying the output of said single phase inverter to at least one winding of said three phase converter, and capacitance means connected across another of said three phase windings whereby said phase converter is self-starting, and terminal means connected to said three phase windings whereby three phase voltages are developed across said terminal means.

ADOLPH C. BUNBLASKY.

REFERENCES CITED

The following references are of record in the file of this patent:

UNITED STATES PATENTS

| Number | Name | Date |
|---|---|---|
| 1,246,617 | Lamme | Nov. 13, 1917 |
| 1,712,719 | Schon | May 14, 1929 |
| 1,744,711 | Von Arco | Jan. 21, 1930 |
| 1,835,156 | Hazeltine | Dec. 8, 1931 |
| 1,921,704 | Schmidt | Aug. 8, 1933 |
| 1,955,133 | Kouacs | Apr. 17, 1934 |
| 2,053,426 | Evans | Sept. 8, 1936 |
| 2,333,593 | Slepian | Nov. 2, 1943 |
| 2,557,901 | Wiseman | June 19, 1951 |